United States Patent
Kajita et al.

(10) Patent No.: US 7,132,924 B2
(45) Date of Patent: Nov. 7, 2006

(54) CONSTRUCTION MACHINE

(75) Inventors: Shigeo Kajita, Tokyo (JP); Yukihiro Uto, Hyogo (JP); Nobuaki Matoba, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 236 days.

(21) Appl. No.: 10/416,313

(22) PCT Filed: Aug. 30, 2002

(86) PCT No.: PCT/JP02/08796

§ 371 (c)(1),
(2), (4) Date: May 8, 2003

(87) PCT Pub. No.: WO03/042015

PCT Pub. Date: May 22, 2003

(65) Prior Publication Data

US 2004/0036583 A1    Feb. 26, 2004

(30) Foreign Application Priority Data

Nov. 16, 2001   (JP) ............................. 2001-351924

(51) Int. Cl.
*G08B 29/00* (2006.01)

(52) U.S. Cl. ................. 340/5.3; 340/429.1; 340/425.5; 340/825.72; 340/825.69; 180/287; 180/289; 701/35; 701/36; 701/32; 701/50; 701/56; 701/112

(58) Field of Classification Search ............ 340/426.1, 340/825.72, 825.69, 425.5, 5.3; 701/35, 701/36, 32, 50, 56, 112; 180/287, 289
See application file for complete search history.

(56) References Cited

U.S. PATENT DOCUMENTS

| | | | | |
|---|---|---|---|---|
| 5,752,333 A | * | 5/1998 | Nakagawa et al. | ............ 37/348 |
| 6,269,292 B1 | * | 7/2001 | Kokubu et al. | ................ 701/35 |
| 6,614,361 B1 | * | 9/2003 | Kinugawa | .............. 340/870.16 |

FOREIGN PATENT DOCUMENTS

| | | |
|---|---|---|
| JP | 10-82223 | 3/1998 |
| JP | 2000-27240 | 1/2000 |
| JP | 2001-123481 | 5/2001 |

OTHER PUBLICATIONS

Patent Abstracts of Japan for JP 2001-123481 published on May 8, 2001.
Patent Abstracts of Japan for JP 10-082223 published on Mar. 31, 1998.
Patent Abstracts of Japan for JP 2000-027240 published on Jan. 25, 2000.

* cited by examiner

*Primary Examiner*—Brian Zimmerman
*Assistant Examiner*—Vernal Brown
(74) *Attorney, Agent, or Firm*—Darby & Darby

(57) ABSTRACT

A construction machine which is less vulnerable to theft compared with conventional machines is provided. The system includes an antenna (6) for detecting removal of an engine key (8) after the engine has stopped, an angle detector (35) for detecting a posture of the upper structure, and an anti-theft unit (31) for forcing the engine to stop and outputting an alarm signal in cases the upper structure is not in a given posture when parked.

6 Claims, 10 Drawing Sheets

CONSTRUCTION MACHINE

This is a U.S. national phase application under 35 U.S.C. 371 of International Patent Application No. PCT/JP02/08796 filed Aug. 30, 2002, and claims the benefit of Japanese Patent Application No. 2001-351924 filed Nov. 16, 2001. The International Application has not published to date.

TECHNICAL FIELD

The present invention relates to a construction machine equipped with an anti-theft means.

BACKGROUND OF THE INVENTION

A construction machine, such as a hydraulic excavator, is typically equipped with an engine, which serves as a power source, and an operator's cab, which is provided with operation switches for performing various works, including starting or stopping the engine. Unlike automobiles, construction machines are normally designed to be operated with a common engine key so that an operator can operate a plurality of construction machines with a single type of key. This, however, makes construction machines vulnerable to theft or tampering. In order to solve this problem, a construction machine is usually equipped with an anti-theft system.

FIG. 11 shows a block diagram of an example of conventional anti-theft systems. FIG. 12 is a control block diagram of an anti-theft unit of said anti-theft system. FIG. 13 is a system block diagram of a hydraulic excavator, which is employed herein as an example of construction machines.

As shown in FIG. 11, a starter switch 10 is provided. The starter switch 10 serves to start or stop the engine by switching the electric power, which is supplied from a battery 9 as a result of operation of the engine key 8. A main relay 11, which is adapted to be energized by the starter switch 10, is connected to an engine start-up relay 12 and a solenoid valve relay 13. The main relay 11 is adapted to be turned on or off by operating the starter switch 10 so as to supply electric power to various components of the main body of the construction machine, which are not shown in the drawings.

Connected to the solenoid valve relay 13 is a hydraulic locking switch 14 to be operated by an operator when the machine is being driven. The hydraulic locking switch 14 is for ensuring safety by being kept in the off position when the machine is not being operated.

A starter motor 15 for starting up the engine is connected to the engine start-up relay 12. A solenoid-operated directional control valve 16 for controlling the direction of pressurized pilot oil is connected to the solenoid valve relay 13. Numeral 17 denotes a ground wire.

The anti-theft system mainly comprises an anti-theft unit 1, an antenna 6, and an identification tag 7 (the term 'identification' will hereinafter be abbreviated as 'ID'). The antenna 6 is incorporated in the starter switch 10. The ID tag 7 is for identifying an individual and attached to an engine key 8.

The anti-theft unit 1 includes a control unit 2, a power supply unit 3, and relays 4,5, which are adapted to be controlled by output from the control unit 2.

FIG. 12 is a control block diagram of the control unit 2. The control unit 2 is provided with an ID code determining unit 20 and an ID code storage unit 21 connected to the ID code determining unit 20. The ID code storage unit 21 is for identifying an individual machine.

By means of radio communication between the antenna 6 and the ID tag 7, the ID code of the ID tag 7 is read into the control unit 2. The control unit 2 is adapted to receive ACC contact signals from the starter switch 10; when the ACC contact of the starter switch 10 is on, the ID code determining unit 20 functions to collate the ID code of the ID tag 7 with the ID code stored in the ID code storage unit 21, and, according to the result of collation, the relays 4,5 are activated.

Referring to FIG. 13, pressurized oil fed from a main pump 23, which is adapted to be driven by the engine 22, is controlled and distributed to hydraulic cylinders 25 by control valves 24. The circuit pressure in a pump discharge circuit is limited by a relief valve 26.

A pilot pump 27 driven by the engine 22 discharges pressurized pilot oil, which is fed to the aforementioned solenoid-operated directional control valve 16. The solenoid-operated directional control valve 16 determines whether the pilot oil should be fed to solenoid-operated directional control valves 28a, 28b, 28c or discharged into a tank. The solenoid-operated directional control valves 28a, 28b, 28c are remote control valves for controlling the control valves 24. The pilot pressure is held at a certain constant level by a pilot pressure relief valve 29.

Next, the function of the example of conventional anti-theft systems described above is explained hereunder.

Referring to FIG. 11, when the engine key 8, to which an ID tag 7 is attached, is inserted into the starter switch 10 and turned from the OFF position to the ACC position, radio communication is activated between the antenna 6 and the ID tag 7 so that the ID code associated with the ID tag 7 is read into the anti-theft unit 1.

The ID code determining unit 20 of the control unit 2 shown in FIG. 12 collates the ID code of the ID tag 7 with the ID code stored in the ID code storage unit 21. If the two ID codes match, an ON signal is output from the ID code determining unit 20 so that the engine start-up relay 12 and the solenoid valve relay 13 are energized via the relays 4,5.

When the starter switch 10 is turned to the start-up position ST in the state described above, an electric current is supplied to the starter motor 15 via the main relay 11 and the engine start-up relay 12 so that the engine 22 starts up.

Should the operator turn on the hydraulic locking switch 14, the solenoid-operated directional control valve 16 switches over from chamber n to chamber a so as to feed the pressurized oil from the pilot pump 27 to the remote control valves 28. By operating the remote control valves 28, the directional control valves 24 can be changed over so that the pressurized oil from the main pump 23 is fed to the appropriate hydraulic cylinders 25.

Because of the function described above, an operator can drive the construction machine by using an engine key 8 to which a registered ID tag 7 is attached.

Should an attempt be made to start the engine with an engine key 8 having an unregistered ID tag 7 or having no ID tag 7 at all, neither the engine start-up relay 12 nor the solenoid valve relay 13 will be energized, because the ID codes do not match. As a result, it becomes impossible to start the engine or operate the construction machine.

When the anti-theft unit 1 of a conventional anti-theft system is installed at a place that allows easy installation, it is easy to disable the anti-theft unit 1 by removing the unit or cutting a cable.

Another problem of the conventional system described above lies in that the system permits start-up of the engine by merely checking ID codes; it is vulnerable to theft, because the engine 22 can be started by connecting the plus line of the battery 9 directly to the starter motor 15.

In order to solve the above problems, an object of the invention is to provide a construction machine which is less vulnerable to theft compared with conventional construction machines.

DISCLOSURE OF THE INVENTION

A construction machine according to the present invention includes a machine body, an engine which serves as a power source for the machine body, a key-removal detecting means for detecting removal of the engine key after the engine is stopped, a posture detecting means for detecting a posture of the machine body, and an anti-theft means adapted to output an alarm signal in cases where the machine body from which the engine key has been removed is not in a given, proper parking posture. In the event the machine body is put into motion by unauthorized start-up of the engine without using the engine key, such a situation is detected by the key-removal detecting means and the posture detecting means, and an alarm signal is output by the anti-theft means. Therefore, compared with conventional art, the invention is capable of reducing the possibility of theft of the construction machine.

A construction machine according to another feature of the present invention includes an undercarriage, an upper structure rotatably mounted on the undercarriage, an engine which serves as a power source for the undercarriage and the upper structure, a key-removal detecting means for detecting removal of the engine key after the engine is stopped, a posture detecting means for detecting a rotated posture of the upper structure, and an anti-theft means adapted to output an alarm signal when the upper structure from which the engine key has been removed is not in a given, proper parking posture. In the event the upper structure is put into motion by unauthorized start-up of the engine without using the engine key, such a situation is detected by the key-removal detecting means and the posture detecting means, and an alarm signal is output by the anti-theft means. Therefore, compared with conventional art, the invention is capable of reducing the possibility of theft of the construction machine.

The anti-theft means of a construction machine according to yet another feature of the present invention is designed to prevent the engine from starting up and output an alarm signal when any engine key other than an engine key that permits identification of an individual person. As the anti-theft means functions to prevent the engine from starting up and output an alarm signal in cases where an engine key that does not permit identification of an individual has been used, theft of a construction machine by use of an unauthorized engine key can reliably be prevented.

The anti-theft means of a construction machine according to yet another feature of the present invention is designed to force the engine to stop and output an alarm signal when the construction machine from which the engine key has been removed is no longer in a given, proper parking posture as a result of unauthorized start-up of the engine. With the configuration as above, should the engine be started up by connecting the battery directly to the starter motor or by any other unauthorized means, the anti-theft means function to force the engine to stop and output an alarm signal when the construction machine becomes out of a proper parking posture. Therefore, the construction machine is reliably protected against theft.

The anti-theft means of a construction machine according to yet another feature of the present invention is an anti-theft unit adapted to output an alarm signal in cases where the upper structure is not in a given, proper parking posture when the engine key is removed, said anti-theft unit being provided with a unit mounting portion, in which the anti-theft unit is installed, and a cover for closing off the unit mounting portion from underneath, the unit mounting portion being provided at such a location that it is inside the bottom portion of the upper structure and faces the undercarriage when the machine body is in a given, proper parking posture. As an alarm signal is output when the upper structure is not in a proper parking posture, an operator is always obliged to put the upper structure in a proper parking posture when parking the construction machine. When the upper structure is in a proper parking posture, there is only a slight gap between the undercarriage and the cover, which closes off the unit mounting portion for mounting the anti-theft unit. As the presence of the undercarriage makes it difficult to remove the cover or the anti-theft unit, the construction machine is protected against theft which could otherwise occur by the removal of the anti-theft unit.

A construction machine according to yet another feature of the present invention includes a machine body having an identification code, an identification code input means for inputting an identification code of an operator of the machine body, a posture detecting means for detecting a posture of the machine body, a posture storage means for storing the posture of the machine body at the time the machine is parked, a determining means for comparing output from the posture detecting means and output from the posture storage means so as to determine whether the machine body has been actuated, a collating means for collating the identification code of the operator, which has been read according to a result of determination of actuation of the machine body by the determining means, with the identification code of the machine body, and a machine stopping means for forcing the machine body to stop when the result of collation by the collating means has proven to not match. When the determining means ascertains, as a result of comparison of output from the posture detecting means with output from the posture storage means, that the machine body has been actuated, the collating means automatically functions to collate the identification code of the operator with the identification code of the machine body. Should the result of collation by the collating means prove to not match, the machine stopping means forces the machine body to stop, because it can be assumed that the machine body is being moved by some unauthorized means. The invention is thus effective in reducing the possibility of theft of the construction machine, compared with conventional art.

A construction machine according to yet another feature of the present invention includes an alarm output means for outputting an alarm when the result of collation by the collating means has proven to not match. With the configuration as above, should the result of collation by the collating means prove to not match, the anti-theft system of the invention causes the machine stopping means to force the machine body to stop and the alarm output means to output an alarm, thereby reliably preventing theft of the construction machine.

According to yet another feature of the present invention, the machine body of the construction machine includes a work arm which is adapted to be operated vertically and provided with at least one hydraulic actuator for operating the work arm; said hydraulic is provided with a pressure detector for detecting whether the distal end of the work arm is in contact with the ground; the posture detecting means is provided at such a location as to be able to detect the posture of the work arm; and the alarm output means serves to output an alarm when the pressure detector detects that the distal end of the work arm is not in contact with the ground when the machine body is in the parked state. As the machine stopping means forces the machine body to stop also when the work arm is operated by some unauthorized means, the invention is effective in reducing the possibility of theft of the construction machine, compared with conventional art. Furthermore, unless the distal end of the work arm in properly in contact with the ground, the alarm output means outputs an alarm when the machine is parked. The invention thus ensures that the construction machine is in a secure posture when in the parked state, with the end of the work arm resting on the ground.

A construction machine according to yet another feature of the present invention includes a machine body having an identification code, an identification code input means for inputting an identification code of an operator of the machine body, an engine which serves as a power source for the machine body, an engine rotation detector for detecting rotation of the engine, a determining means for ascertaining build-up of engine rotation based on a result of detection by the engine rotation detector, a collating means for collating the identification code of an operator, which has been read according to a result of determination by the determining means of build-up of engine rotation, with the identification code of the machine body, and a machine stopping means and an alarm output means which are respectively adapted to force the machine body to stop and output an alarm when the result of collation by the collating means has proven to not match. When the determining means ascertains build-up of engine rotation, the collating means automatically functions to collate the identification code of the operator with the identification code of the machine body. Should it be ascertained that the identification codes do not match as a result of collation, it can be assumed that the engine is started up by some unauthorized means, such as connecting the battery directly to the starter motor. In such a case, therefore, the machine stopping means forces the machine body to stop, while the alarm output means outputs an alarm so that theft of the construction machine can be reliably prevented.

According to yet another feature of the present invention, the construction machine is provided with an engine controller, which serves to control rotation of the engine, and an anti-theft unit which includes at least a determining means and a collating means, wherein the aforementioned engine rotation detector is connected to the engine controller via the anti-theft unit. With the configuration as above, signals from the engine speed detector are input into the engine controller via the anti-theft unit. Therefore, should the anti-theft unit be removed or the cable be cut, the start-up of the engine would be disabled. The anti-theft system of the invention is thus capable of preventing theft of the construction machine which could otherwise be effected by cutting the cable or removing the anti-theft unit.

PREFERRED EMBODIMENT OF THE INVENTION

Figure 4:
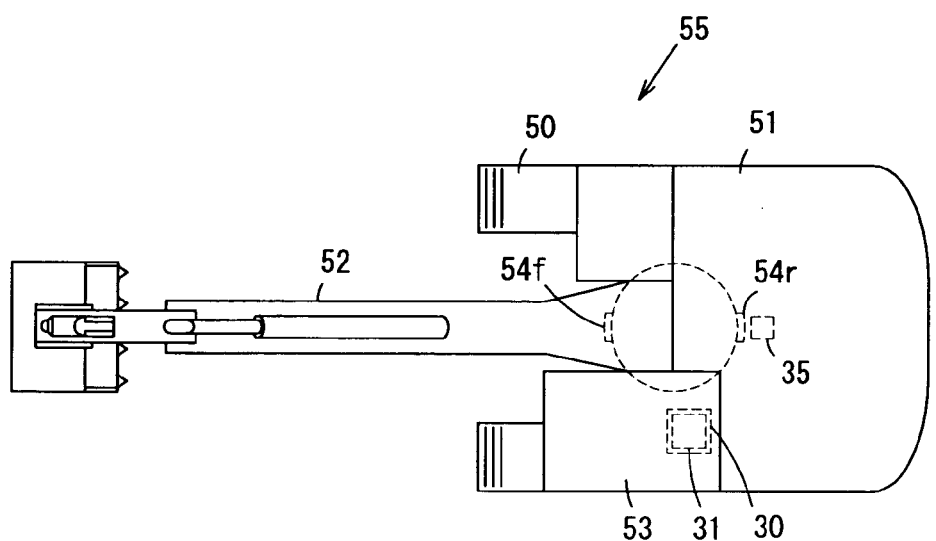
FIG. 4 is a plan view illustrating how the anti-theft unit and an angle detector of said hydraulic excavator are installed.
Figure 5:
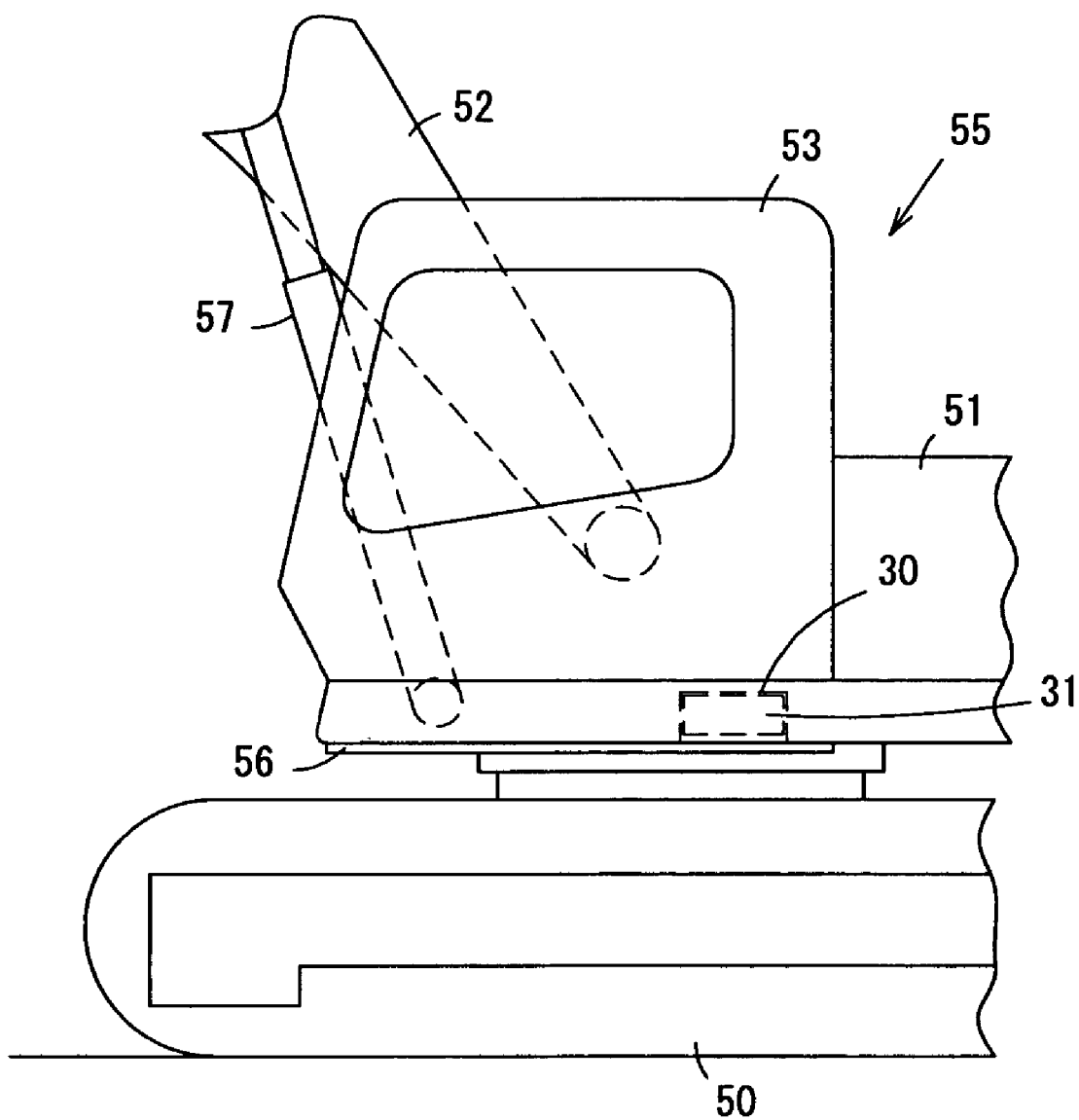
FIG. 5 is an enlarged front view of the operator's cab of said hydraulic excavator to illustrate how the anti-theft unit is installed.
Figure 6:
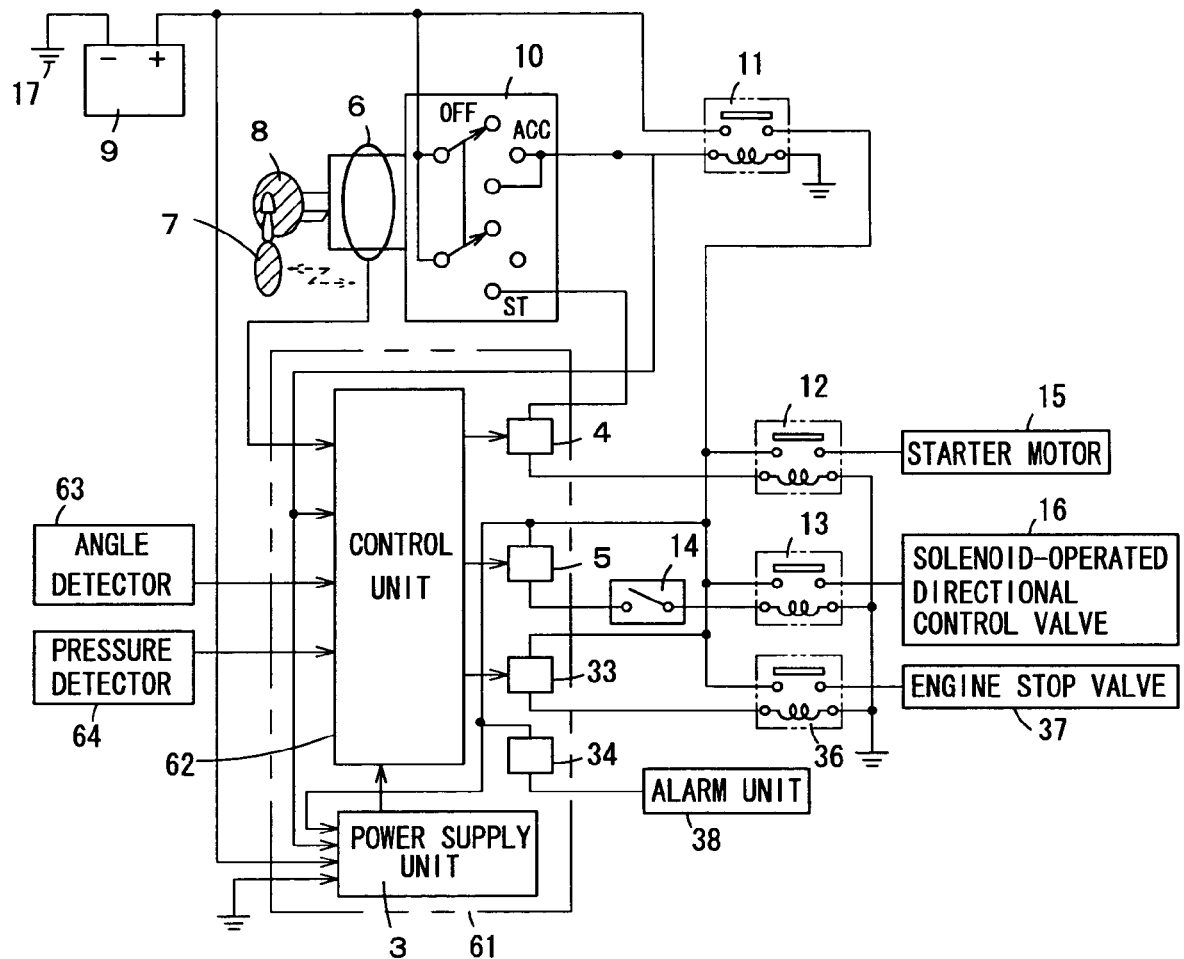
FIG. 6 is a circuit diagram showing an anti-theft system employed in a construction machine according to a second embodiment of the present invention.
Figure 7:
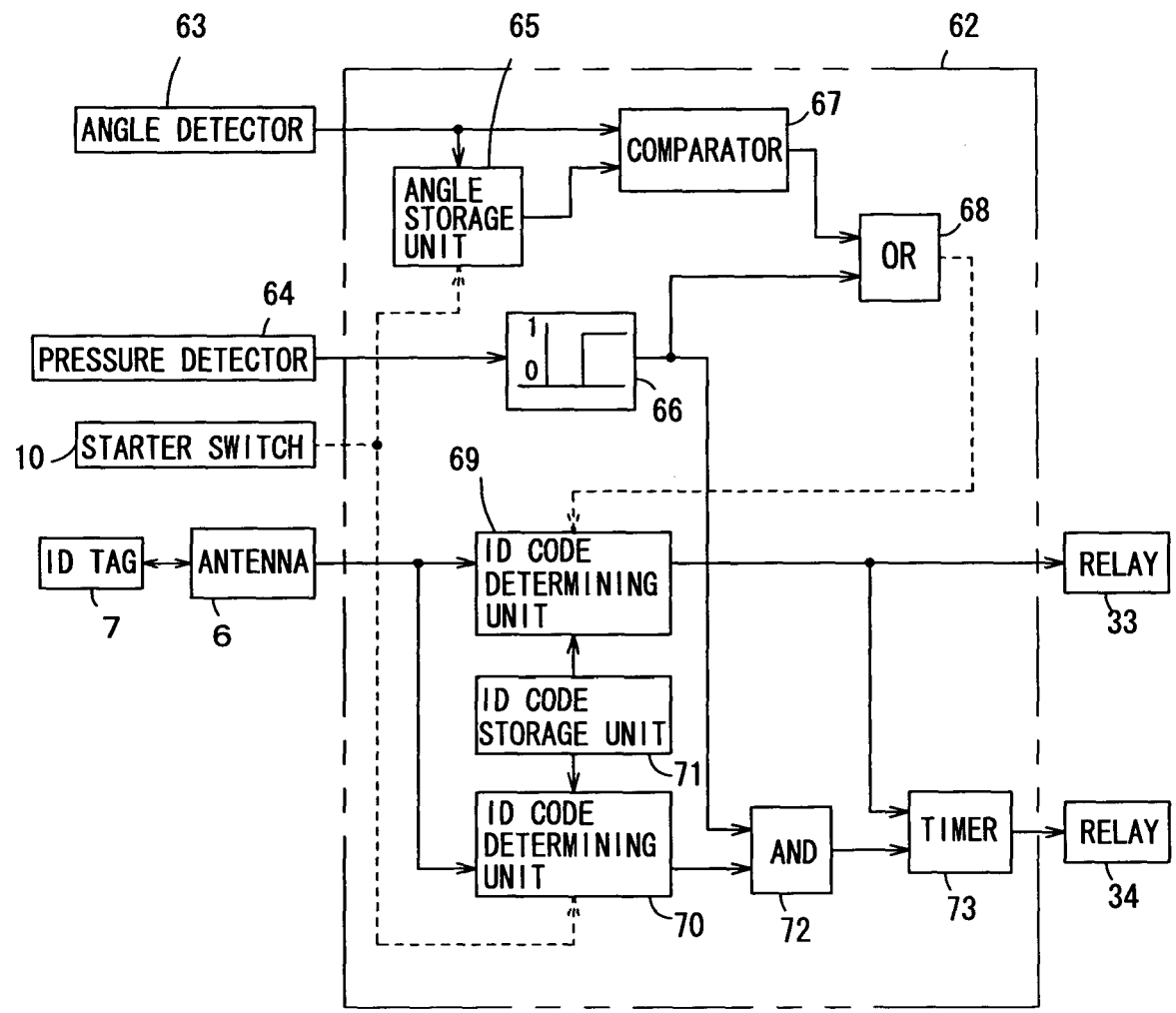
FIG. 7 is a control block diagram of an anti-theft unit of said anti-theft system.
Figure 8:
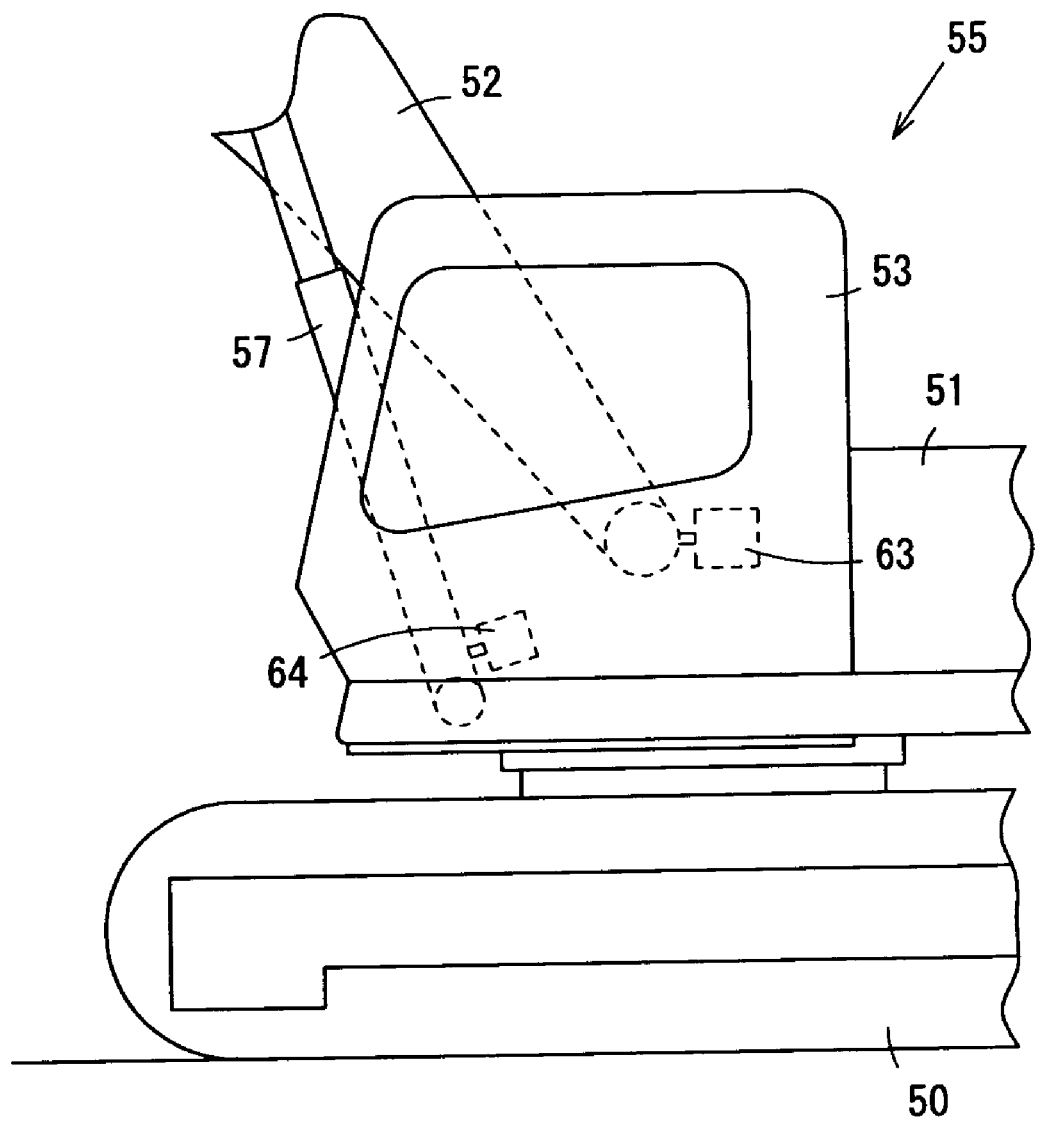
FIG. 8 is an enlarged front view of the operator's cab of a hydraulic excavator which serves as a construction machine using said anti-theft system, the drawing illustrating how the anti-theft unit and an angle detector of said hydraulic excavator are installed.
Figure 9:
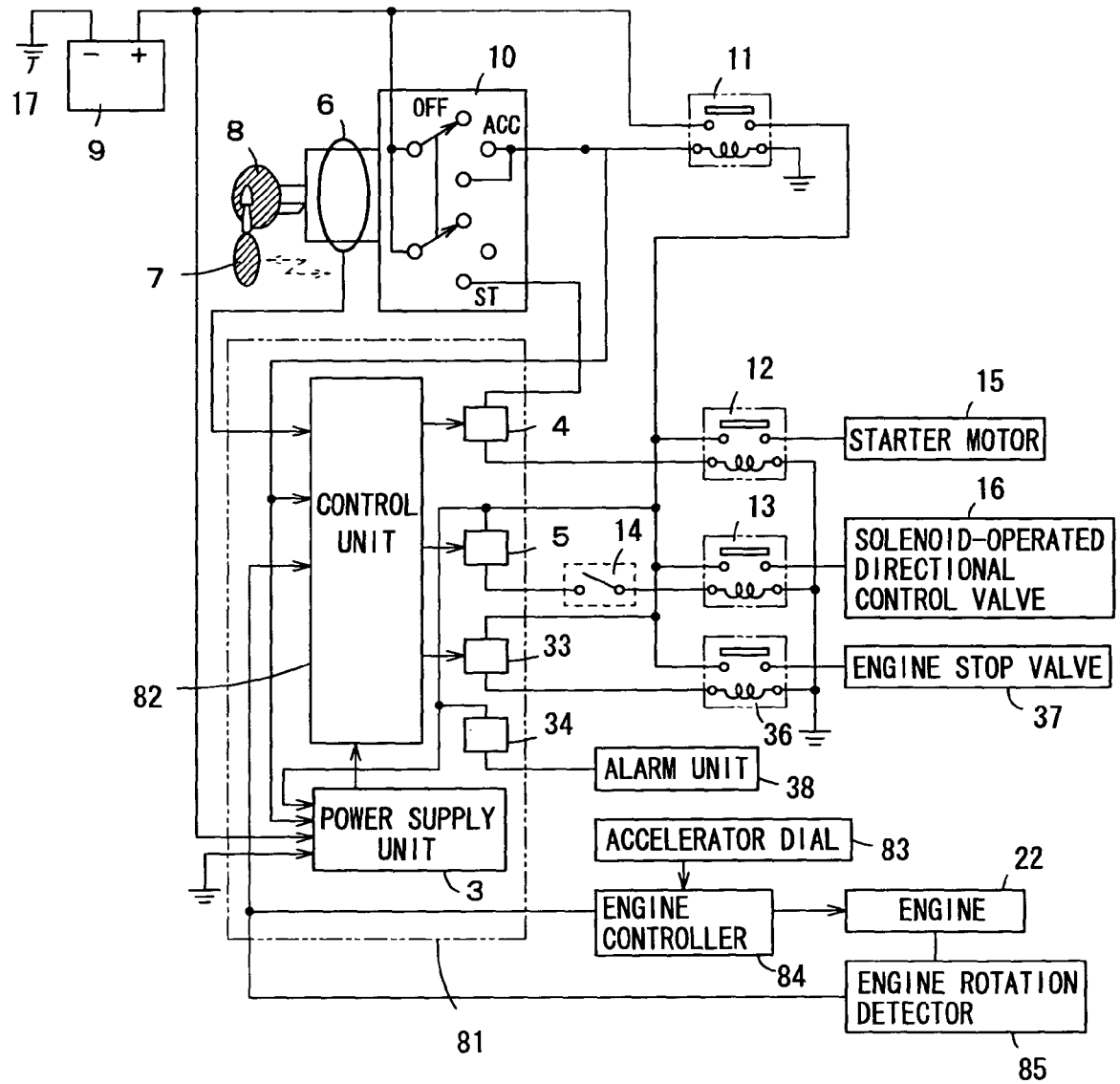
FIG. 9 is a circuit diagram showing an anti-theft system employed in a construction machine according to a third embodiment of the present invention.
Figure 10:
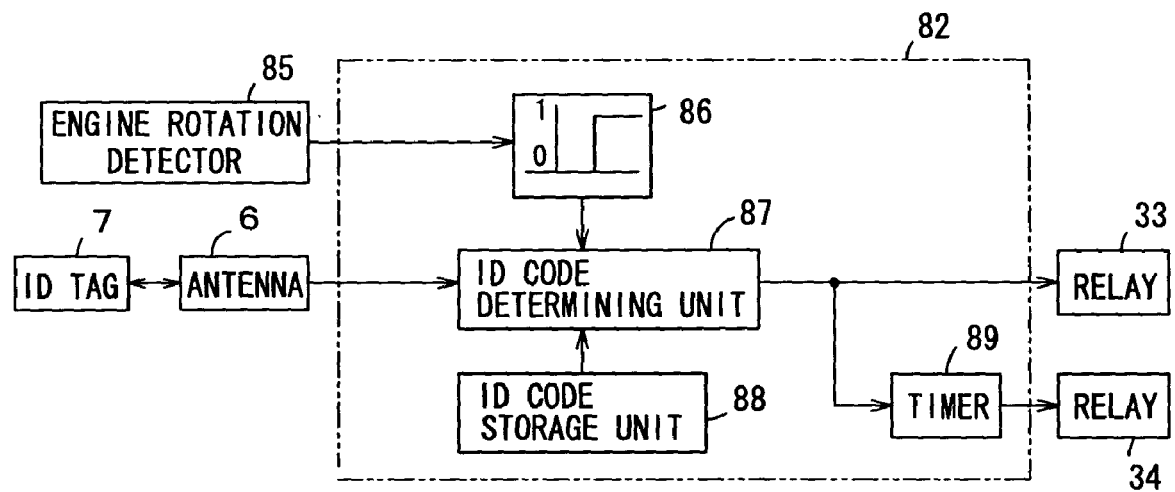
FIG. 10 is a control block diagram of an anti-theft unit of said anti-theft system.

Next, the present invention is explained in detail, referring to a first embodiment thereof shown in FIGS. 1 through 5, a second embodiment shown in FIGS. 6 through 8, and a third embodiment shown in FIGS. 9 and 10.

Figure 1:
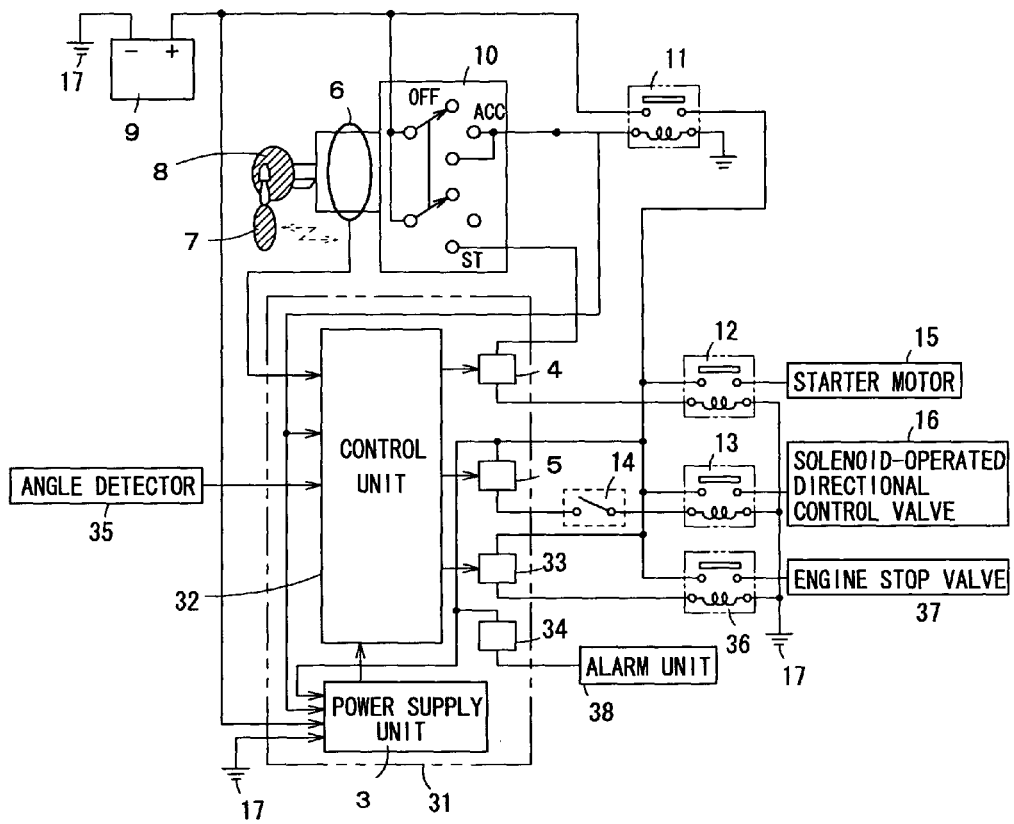
FIG. 1 is a circuit diagram showing an anti-theft system employed in a construction machine according to a first embodiment of the present invention.
Figure 2:
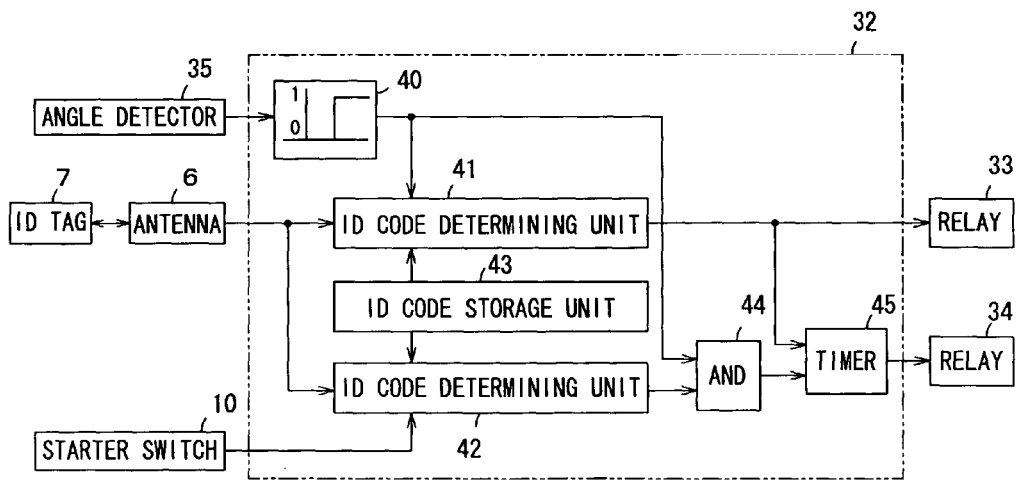
FIG. 2 is a control block diagram of an anti-theft unit of said anti-theft system.
Figure 3:
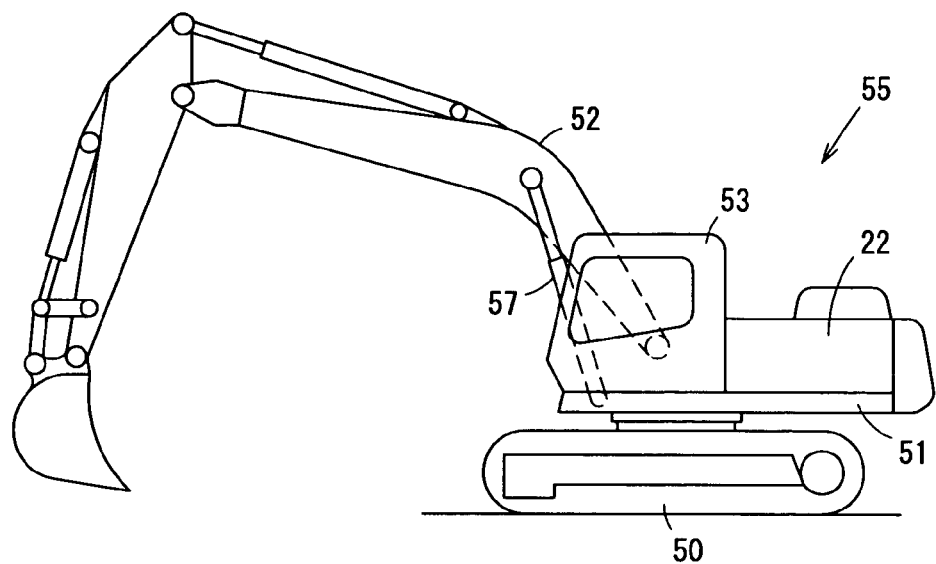
FIG. 3 is a front view of a hydraulic excavator which serves as a construction machine using said anti-theft system.

First, the first embodiment shown in FIGS. 1 through 5 is explained hereunder. FIG. 1 shows an example of a circuit of an anti-theft system incorporated in a construction machine. FIG. 2 shows a control block diagram of a control unit of its anti-theft unit. FIGS. 3 through 5 show the structure of a hydraulic excavator and how the anti-theft unit and an angle detector are installed.

Figure 11:
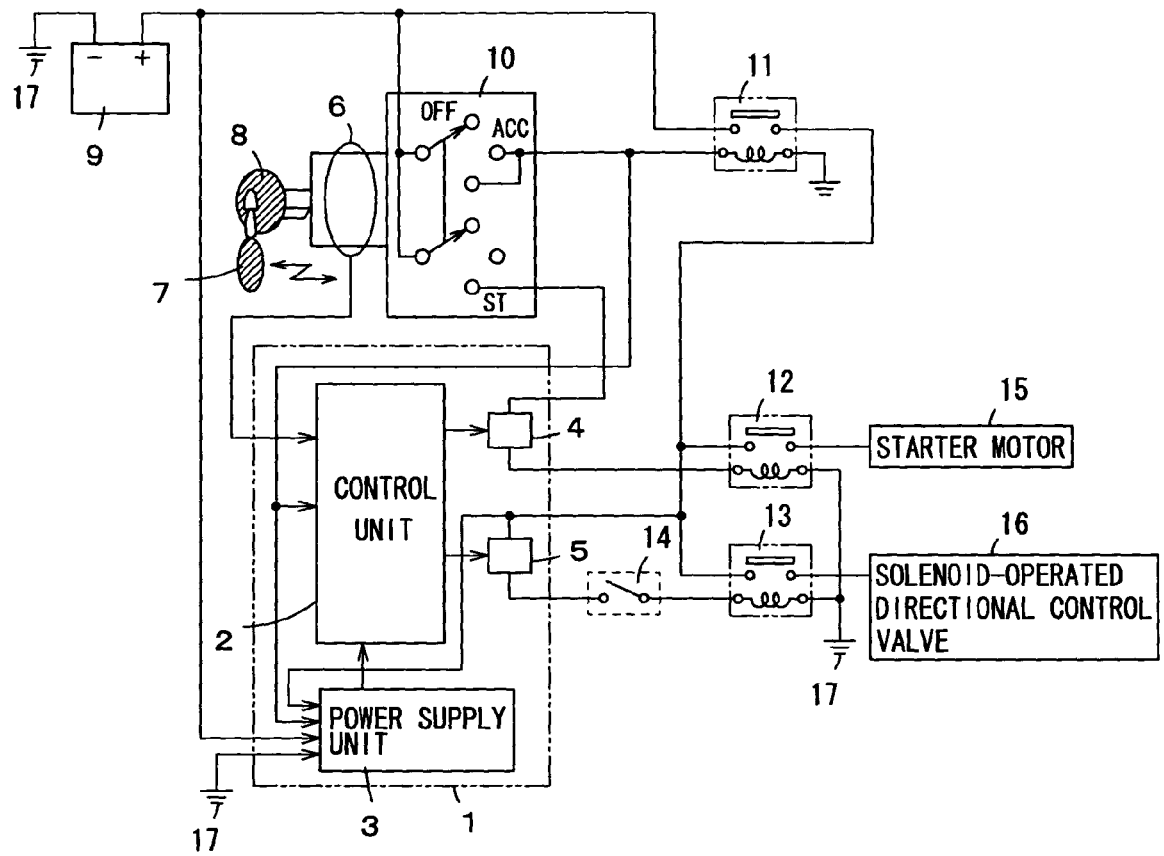
FIG. 11 is a circuit diagram of an example of an anti-theft system employed in a conventional construction machine.

Referring to FIG. 1, the circuit configuration of various components of the hydraulic excavator is the same as the circuit according to the conventional art shown in FIG. 11. Therefore, elements corresponding to those in FIG. 11 are identified with the same reference numerals, and explanation thereof is omitted herein.

The anti-theft system shown in FIG. 1 includes an anti-theft unit 31, which serves as an anti-theft means, a starter switch 10, and an antenna 6 serving as a key-removal detecting means. The antenna 6 is incorporated in the starter switch 10 and connected to the anti-theft unit 31. The starter switch 10 is adapted to be turned with an engine key 8. An identification tag 7 (the term 'identification' will hereinafter be abbreviated as 'ID') for identifying an individual is attached to the engine key 8. The ID tag 7 serves as an identification code input means for automatically inputting into the anti-theft unit 31 the ID code of an operator of the machine.

The anti-theft unit 31 includes a control unit 32, a power supply unit 3, and relays 4,5,33,34 adapted to be controlled by output from the control unit 32.

An angle detector 35, which serves as a posture detecting means for detecting a rotated posture, i.e. a rotation angle, is connected to the control unit 32. An engine stop relay 36 is connected to the relay 33. An engine stop valve 37 for interrupting fuel to the engine is connected to the engine stop relay 36. An alarm unit 38 is connected to the relay 34.

The relay 33, the engine stop relay 36, and the engine stop valve 37 together form a machine stopping means for forcing the machine to stop. The relay 34 and the alarm unit 38 together form an alarm output means for outputting an alarm.

Figure 12:
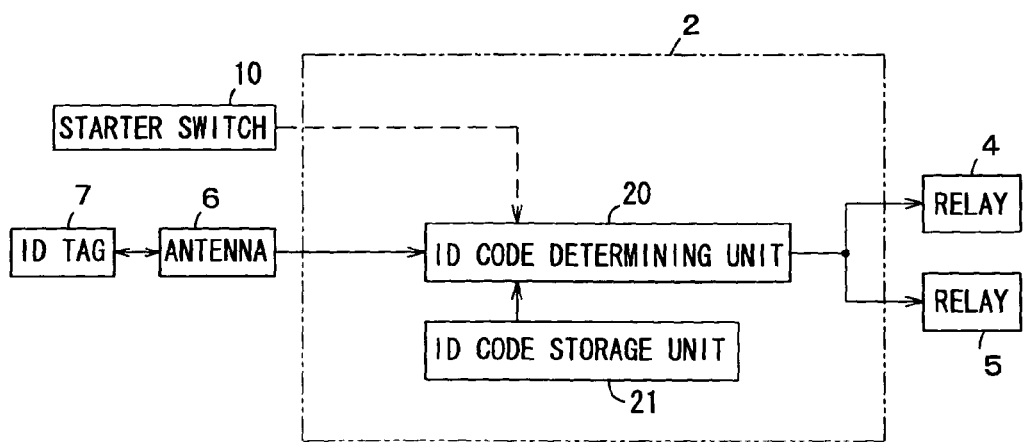
FIG. 12 is a control block diagram of an anti-theft unit of said anti-theft system.
Figure 13:
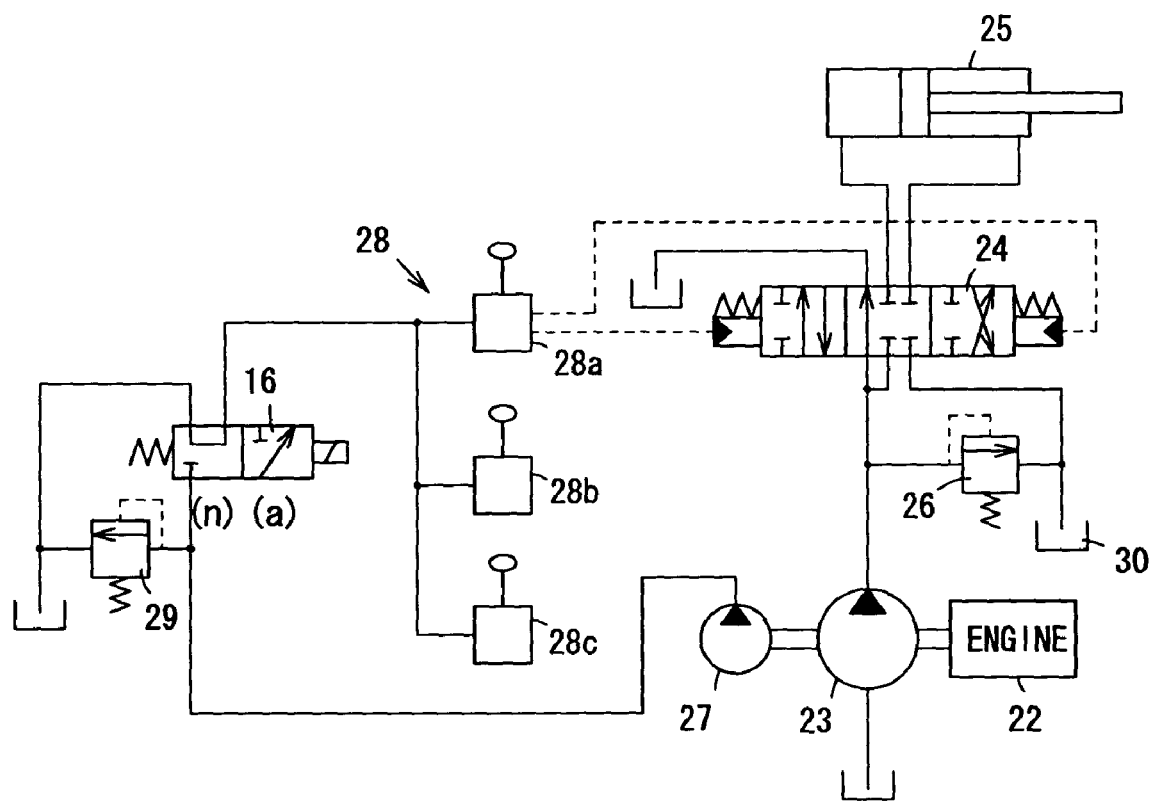
FIG. 13 is a circuit diagram showing an example of a hydraulic circuit of a hydraulic excavator.

As the function of the anti-theft system to check the ID code of the ID tag 7 and activate the engine start-up relay 12 and the solenoid valve relay 13 is the same as that of the conventional art shown in FIG. 12, its explanation is omitted herein. Only a control arithmetic circuit of the invention is shown in FIG. 2.

FIG. 2 shows a control block diagram of the anti-theft unit 32, which is adapted to receive signals from the angle detector 35, ACC contact signals from the starter switch 10, and, via the antenna 6, the ID code of the ID tag 7.

The angle detector 35 is connected to an angle determining unit 40, which serves to output ON/OFF signals based on signals output from the angle detector 35. To be more specific, it outputs an OFF signal (representing a 0 in a logical circuit) when an angle is within a given range, and an ON signal (representing a 1 in a logical circuit) when an angle is outside the given range.

ID code determining units 41,42 are connected to the antenna 6. An ID code storage unit 43 is connected to the ID code determining units 41,42.

The ID code determining unit 41 is designed to read an ID code when the angle determining unit 40 is on and collate the ID code that has been read with the ID code in the ID code storage unit 43. In cases where the ID code determining unit 41 does not recognize an ID code or ascertains that the two ID codes do not match, the ID code determining unit 41 outputs an ON signal. When a match is ascertained, the ID code determining unit 41 outputs an OFF signal.

The ID code determining unit 42 is designed to read an ID code when the ACC contact is in the disconnected state and collate the ID code that has been read with the ID code in the ID code storage unit 43. In cases where the ID code determining unit 42 does not recognize an ID code or ascertains that the two ID codes do not match, the ID code determining unit 42 outputs an ON signal. When a match is ascertained, the ID code determining unit 41 outputs an OFF signal.

The angle determining unit 40 and the ID code determining unit 42 are connected to input terminals of an AND computing unit 44. The respective output terminals of the AND computing unit 44 and the ID code determining unit 41 are connected to a timer 45. The timer 45 serves to output an ON signal for a given period of time upon receiving an ON signal from either the ID code determining unit 41 or the AND computing unit 44.

The ID code determining unit 41 is connected to the relay 33, which is provided to activate the engine stop relay 36. The timer 45 is connected to the relay 34, which is provided to activate the alarm unit 38.

FIGS. 3 and 4 respectively represent a front view and a plan view of the hydraulic excavator. FIG. 5 is an enlarged view of the part where its operator's cab is located.

Referring to FIGS. 3, 4, and 5, numeral 50 denotes an undercarriage. An upper structure 51 is rotatably mounted on the undercarriage 50. A work arm 52 is secured to the upper structure 51 by a shaft in such a manner that the work arm 52 is able to swing vertically. The upper structure 51 also includes an operator's cab 53. These components together form a machine body 55.

As shown in FIG. 4, the undercarriage 50 has protruding plates 54f, 54r, which are respectively located at the front and back of the portion where the undercarriage 50 is connected to the upper structure 51. The upper structure 51 is provided with the angle detector 35 described above so that the orientation of the work arm 52 can be detected by the angle detector 35.

As shown in FIG. 5, the anti-theft unit 31 is installed in a unit mounting portion 30, which is open at the bottom and located at the base of the operator's cab 53. The unit mounting portion 30 may desirably be located above the undercarriage 50 when the machine is parked in such a posture as shown in FIG. 4. The underside of the unit mounting portion 30 is closed off by a cover 56.

The work arm 52 is adapted to be swung vertically by hydraulic actuators, i.e. hydraulic cylinders 57 provided between the upper structure 51 and the work arm 52.

Next, the function of the first embodiment is explained. As the circuit shown in FIG. 1 has the same function of starting the engine as in the case of the conventional art described above, its explanation is omitted herein. Therefore, the function concerning the present invention will now be explained.

(1) When the Construction Machine is Stopped, and the Engine Key is Removed

Referring to FIG. 1, an explanation is given of the function of the first embodiment when the starter switch 10 is turned off to stop the construction machine, and the engine key 8 is pulled out of the starter switch 10 and moved away from the antenna 6.

Turning off the starter switch 10 cuts off the ACC contact, thereby activating the ID code determining unit 42.

The ID code determining unit 42 is designed to read an ID code when the ACC contact is in the disconnected state and collate the ID code that has been read with the ID code in the ID code storage unit 43. In cases where the ID code determining unit 42 does not recognize an ID code or ascertains that the two ID codes do not match, the ID code determining unit 42 outputs an ON signal. When a match is ascertained, the ID code determining unit 41 outputs an OFF signal.

Therefore, turning off the starter switch 10 and removing the engine key 8 from the starter switch 10 and moving the engine key 8 away from the antenna 6 causes the ID code determining unit 42 to output an ON signal, because the ID code determining unit 42 becomes unable to read the ID code.

In cases where the work arm 52 is oriented straight forward or rearward with respect to the traveling direction as shown in FIG. 4, the angle detector 35 detects the protrusion plate 54f or the protrusion plate 54r so that the angle determining unit 40 outputs an OFF signal. When the work arm 52 is oriented neither straight forward nor rearward with respect to the traveling direction, the angle determining unit 40 outputs an ON signal, because the angle detector 35 is unable to detect either protrusion plate 54f, 54r.

Signals from the angle determining unit 40 and the ID code determining unit 42 are input into the AND computing unit 44, which carries out a logical product operation. The result of the operation is then output from the AND computing unit 44 and activates the relay 34 via the timer 45.

Therefore, when the engine key 8 is removed from the starter switch 10 in the state that the machine is not in a given, proper parking posture, with the work arm 52 being oriented neither straight forward nor rearward, both the angle determining unit 40 and the ID code determining unit 42 output ON signals so that the AND computing unit 44 outputs an ON signal, thereby energizing the relay 34 via the timer 45. As a result, the alarm unit 38 is activated to call the operator's attention.

(2) When the Construction Machine is Operated with the Engine Being Started by an Unauthorized Means An explanation is given of a situation where the construction machine is operated with the power source of the machine body 55, i.e. the engine 22, being started by connecting the plus line of the battery 9 directly to the starter motor 15.

When the engine 22 is started and the construction machine is put into operation to move the upper structure 51, the angle determining unit 40 is turned on, and the ID code determining unit 41 is activated.

The ID code determining unit 41 is designed to output an ON signal or an OFF signal as a result of its function of reading an ID code; in cases where no ID code has been received or the ID code that has been read does not correspond to the ID code in the ID code storage unit 43, the ID code determining unit 41 outputs an ON signal. When a match is ascertained, the ID code determining unit 41 outputs an OFF signal.

Therefore, should the upper carriage 51 be moved as a result of operation of the construction machine by an unauthorized means, the ID code determining unit 41 outputs an ON signal to activate the engine stop valve 37, via the relay 33 and the engine stop relay 36. As the engine stop valve 37 interrupts the fuel to the engine 22, the engine 22 stops.

Meanwhile, the relay 34 is energized via the timer 45 so that the alarm unit 38 is activated to sound an alarm. Thus, theft of the machine is prevented.

(3) When an Engine Key that Does Not Permit Identification of an Individual is Used Should any engine key other than an engine key 8 that permits identification of an individual by means of an ID tag 7 is used, the ID code determining unit 41 outputs an ON signal to activate the engine stop valve 37 via the relay 33 and the engine stop relay 36, thereby preventing the engine 22 from starting up. Meanwhile, the ON signal output from the ID code determining unit 41 also causes the timer 45 to output an ON signal, i.e. an alarm signal, for a given period of time so that the alarm unit 38 is activated by the relay 34.

The features described above offer benefits as follows:

(1) The anti-theft unit is designed so that an alarm is output when the construction machine is going to be parked in a posture where the work arm 52 is not parallel with the traveling direction. Therefore, it is always necessary for an operator who is parking the construction machine to position the machine so that the work arm 52 is parallel with the traveling direction. As shown in FIG. 5, when the machine is in such a posture, there is only a slight gap between the undercarriage 50 and the cover 56, which closes off the unit mounting portion 30 of the anti-theft unit 31. The lack of sufficient clearance makes it difficult to remove the cover 56 or the anti-theft unit 31 and consequently prevents theft or unauthorized removal of the anti-theft unit 31.

(2) Should the upper structure 51 be operated with the engine 22 being started by an unauthorized means, the anti-theft system stops the engine and outputs an alarm, thereby preventing unauthorized start-up of the engine 22 and resultant theft of the machine.

(3) Should an engine key that does not permit identification of an individual be used, the anti-theft unit 31 functions to prevent the engine 22 from starting and output an alarm signal to the alarm unit 38. Thus, theft of a construction machine by use of an unauthorized engine key can reliably be prevented.

Next, the second embodiment shown in FIGS. 6 through 8 is explained hereunder. FIG. 6 shows an example of a circuit of an anti-theft system incorporated in a construction machine. FIG. 7 shows a control block diagram of its anti-theft unit. FIG. 8 shows how an angle detector and a pressure detector are installed in a hydraulic excavator.

In these drawings, the circuit configuration of various components of the hydraulic excavator is the same as the circuit according to the conventional art shown in FIG. 11. Therefore, elements corresponding to those in FIG. 11 are identified with the same reference numerals, and their explanation is omitted herein.

The anti-theft system shown in FIG. 6 includes an anti-theft unit 61, a starter switch 10, and an antenna 6 which is incorporated in the starter switch 10 and connected to the anti-theft unit 61. The starter switch 10 is adapted to be turned with an engine key 8. An ID tag 7 for identifying an individual is attached to the engine key 8. The ID tag 7 serves as an identification code input means for automatically inputting into the anti-theft unit 61 the ID code of an operator of the machine.

The anti-theft unit 61 includes a control unit 62, a power supply unit 3, and relays 4,5,33,34 which are adapted to be controlled by output from the control unit 62.

An angle detector 63, which serves as a posture detecting means for detecting a posture of the machine body 55 is connected to the control unit 62. The term "posture of the machine body 55" means a tilted posture, i.e. an angle, of the work arm 52. Also connected to the control unit 62 is a pressure detector 64 for detecting pressure in the head-side of one of the hydraulic cylinders 57. The hydraulic cylinders 57 are hydraulic actuators for vertically swinging the work arm 52.

The pressure detector 64 serves to detect whether the distal end of the work arm 52 is in contact with the ground by detecting a state of pressure in the head-side of the hydraulic cylinder 57 to which the pressure detector 64 is connected; when the pressure in the head-side is low, it is determined that the distal end of the work arm 52 is in contact with the ground.

An engine stop relay 36 is connected to the relay 33. An engine stop valve 37 for interrupting fuel to the engine is connected to the engine stop relay 36. An alarm unit 38 is connected to the relay 34.

Referring to FIG. 6, the relay 33, the engine stop relay 36, and the engine stop valve 37 together form a machine stopping means for forcing the machine to stop. The relay 34 and the alarm unit 38 together form an alarm output means for outputting an alarm.

As the function of the anti-theft system to check the ID code of the ID tag 7 and activate the engine start-up relay 12 and the solenoid valve relay 13 is the same as that of the conventional art shown in FIG. 12, its explanation is omitted herein. Only a control arithmetic circuit of the invention is shown in FIG. 7.

FIG. 7 shows a control block diagram of the anti-theft unit 62, which is adapted to receive signals from the angle detector 63, signals from the pressure detector 64 of the hydraulic cylinder 57, ACC contact signals from the starter switch 10, and, via the antenna 6, the ID code of the ID tag 7.

The angle detector 63 is connected to an angle storage unit 65, which serves as a posture storage means for storing a posture of the machine body 55, in other words a tilted posture, i.e. an angle, of the work arm 52 when the ACC contact is disconnected. The pressure detector 64 is connected to a pressure determining unit 66, which serves to output an OFF signal when the signal from the pressure detector 64 of the hydraulic cylinder 57 represents a pressure not lower than a given level, and an ON signal when the pressure is reduced to less than the given level. The angle detector 63 and the angle storage unit 65 are connected to a comparator 67, which serves as a determining means for comparing a signal from the angle detector 63 with a signal from the angle storage unit 65 so as to determine whether the machine body 55 has been actuated. The pressure determining unit 66 and the comparator 67 are connected to an OR computing unit 68, which serves to compute a logical sum of signals output from the pressure determining unit 66 and the comparator 67.

Connected to the antenna 6 are ID code determining units 69,70, which together serve as a collating means for collating an identification code of an operator of the machine and the ID code of the machine body 55. An ID code storage unit 71 which stores the ID code attached to the machine body 55 is connected to the ID code determining units 69,70.

The ID code determining unit 69 is designed to read an ID code when the OR computing unit 68 is on, and collate the ID code that has been read with the ID code in the ID code storage unit 71. In cases where the ID code determining unit 69 does not recognize an ID code or ascertains that the two ID codes do not match, the ID code determining unit 69 outputs an ON signal. When a match is ascertained, the ID code determining unit 69 outputs an OFF signal.

The ID code determining unit 70 is designed to read an ID code when the ACC contact is in the disconnected state and collate the ID code that has been read with the ID code in the ID code storage unit 71. In cases where the ID code determining unit 70 does not recognize an ID code or ascertains that the two ID codes do not match, the ID code determining unit 70 outputs an ON signal. When a match is ascertained, the ID code determining unit 70 outputs an OFF signal.

The pressure determining unit 66 and the ID code determining unit 70 are connected to input terminals of an AND computing unit 72. The respective output terminals of the AND computing unit 72 and the ID code determining unit 69 are connected to a timer 73. The timer 73 serves to output ON signals for a given period of time upon receiving an ON signal from either the ID code determining unit 69 or the AND computing unit 72.

The ID code determining unit 69 is connected to the relay 33, which serves to activate the engine stop relay 36. The timer 73 is connected to the relay 34, which serves to activate the alarm unit 38.

As shown in FIG. 8, the angle detector 63 is located at the rocking joint portion of the work arm 52. The pressure detector 64 is provided at the head-side of one of the hydraulic cylinders 57 that drive the work arm 52. The pressure detector 64 serves to detect what state the arm 52 is in when the construction machine is in the parked state.

Next, the function of the second embodiment is explained. As the circuit shown in FIG. 6 has the same function of starting the engine as in the case of the conventional art described above, its explanation is omitted herein. Therefore, the function concerning the present invention will now be explained.

(1) When the Construction Machine is Stopped, and the Engine Key is Removed

Referring to FIG. 6, an explanation is given of the function of the second embodiment when the starter switch 10 is turned off to stop the construction machine, and the engine key 8 is pulled out of the starter switch 10 and moved away from the antenna 6.

Turning off the starter switch 10 cuts off the ACC contact, thereby activating the ID code determining unit 70 shown in FIG. 7.

The ID code determining unit 70 is designed to read an ID code when the ACC contact is in the disconnected state and collate the ID code that has been read with the ID code in the ID code storage unit 71. In cases where the ID code determining unit 70 does not recognize an ID code or ascertains that the two ID codes do not match, the ID code determining unit 70 outputs an ON signal. When a match is ascertained, the ID code determining unit 70 outputs an OFF signal.

Therefore, turning off the starter switch 10 and removing the engine key 8 from the starter switch 10 and moving the engine key 8 away from the antenna 6 causes the ID code determining unit 70 to output an ON signal.

Meanwhile, the pressure detector 64 shown in FIG. 8 detects the pressure in the head-side of the hydraulic cylinder 57 to which the pressure detector 64 is attached.

When the distal end of the work arm 52 is fully in contact with the ground, the pressure in the head-side of the hydraulic cylinder 57 is low. Therefore, the pressure determining unit 66 outputs an OFF signal.

When the distal end of the work arm 52 is not in contact with the ground, the pressure determining unit 66 outputs an ON signal, because the pressure in the head-side of the hydraulic cylinder 57 remains high.

Based on outputs of the pressure determining unit 66 and the ID code determining unit 70, the AND computing unit 72 carries out a logical product operation and outputs the result of the operation, thereby activating the relay 34 via the timer 73.

Therefore, when the engine key 8 is removed from the construction machine which is parked in the state that the end of the work arm 52 is not in full contact with the ground, both the pressure determining unit 66 and the ID code determining unit 70 output ON signals so that the AND computing unit 72 outputs an ON signal, thereby energizing the relay 34 via the timer 73. As a result, the alarm unit 38 is activated to warn the operator that the end of the work arm 52 is not in contact with the ground.

(2) When the Construction Machine is Operated with the Engine Being Started by an Unauthorized Means An explanation is given of a situation where the construction machine is improperly operated by connecting the plus line of the battery 9 directly to the starter motor 15 to start the engine 22.

When the work arm 52 is moved, the comparator 67 compares the signal from the angle detector 63 of the work arm 52 with the value stored in the angle storage unit 65.

As the angle of the work arm 52 at the time the starter switch 10 was turned off is stored in the angle storage unit 65, the comparator 67 ascertains that the work arm 52 has been moved.

Meanwhile, based on the state of pressure of the hydraulic cylinder 57, the pressure determining unit 66 determines whether the end of the work arm 52 is in full contact with the ground.

Therefore, when the work arm 52 is moved, the comparator 67 or the pressure determining unit 66 outputs an ON signal, which causes the OR computing unit 68 to output and ON signal, thereby activating the ID code determining unit 69.

The ID code determining unit 69 is designed to read an ID code and output an ON signal or an OFF signal as a result of its function of reading an ID code and collating it with the ID cored in the ID code storage unit 71; in cases where no ID code has been received or the two ID codes do not match, the ID code determining unit 69 outputs an ON signal. When a match is ascertained, the ID code determining unit 69 outputs an OFF signal. Therefore, should the work arm 52 be moved by starting the engine 22 by an unauthorized means, the ID code determining unit 69 outputs an ON signal to activate the relay 34 via the relay 33 and the timer 73. The activated relay 34 then activates the engine stop valve 37 via the engine stop relay 36. The engine stop valve 37 stops the engine 22 by interrupting the fuel to the engine 22, while the alarm unit 38 is activated to sound an alarm to notify those who are in the vicinity of an attempt of theft.

(3) When an Engine Key that Does Not Permit Identification of an Individual is Used Should any engine key other than an engine key 8 that permits identification of an individual by means of an ID tag 7 is used, the ID code determining unit 69 outputs an ON signal to activate the engine stop valve 37 via the relay 33 and the engine stop relay 36, thereby preventing the engine 22 from starting up. Meanwhile, the ON signal output from the ID code determining unit 69 also causes the timer 73 to output an ON signal, i.e. an alarm signal, for a given period of time so that the alarm unit 38 is activated by the relay 34.

Next, the effects of the second embodiment is described.

The features described above offer benefits as follows:

(1) Should the distal end of the work arm 52 be not in contact with the ground at the time of parking, in other words when the engine key 8 is removed after the construction machine is stopped, an alarm is output. With the configuration as above, the system ensures safety by thus requiring the end of the work arm 52 to be in full contact with the ground when the machine is parked.

(2) Should the work arm 52 be operated with the engine 22 being started by an unauthorized means, the anti-theft system outputs an signal to stop the engine and sound an alarm. Therefore, compared with conventional anti-theft systems, the anti-theft system of the second embodiment is less vulnerable to theft.

(3) Should an engine key that does not permit identification of an individual be used, the anti-theft unit 61 functions to prevent the engine 22 from starting up and output an alarm signal to the alarm unit 38. Thus, theft of a construction machine by use of an unauthorized engine key can reliably be prevented.

Next, the third embodiment shown in FIGS. 9 and 10 is explained hereunder. FIG. 9 shows an example of a circuit of an anti-theft system incorporated in a construction machine. FIG. 10 shows a control block diagram of its anti-theft unit.

Referring to FIG. 9, the circuit configuration of various components of the hydraulic excavator is the same as the circuit according to the conventional art shown in FIG. 11. Therefore, elements corresponding to those in FIG. 11 are identified with the same reference numerals, and their explanation is omitted herein.

The anti-theft system shown in FIG. 9 includes an anti-theft unit 81, a starter switch 10, and an antenna 6 which is incorporated in the starter switch 10 and connected to the anti-theft unit 81. The starter switch 10 is adapted to be turned with an engine key 8. An ID tag 7 for identifying an individual is attached to the engine key 8. The ID tag 7 serves as an identification code input means for inputting into the anti-theft unit 81 the ID code of an operator of the machine.

The anti-theft unit 81 includes a control unit 82, a power supply unit 3, and relays 4,5,33,34 which are adapted to be controlled by output from the control unit 82.

An engine controller 84 is connected to the speed governing section of the engine 22. The engine controller 84 is provided to control the engine 22 to a given engine speed, which is set by using an accelerator dial 83. An engine speed detector 85 for detecting the engine speed of the engine 22 is connected to the control unit 82. The engine speed detector 85 is also connected to the engine controller 84 by a cable which is branched inside the anti-theft unit 81.

As the function of the anti-theft system to check the ID code of the ID tag 7 and activate the engine start-up relay 12 and the solenoid valve relay 13 is the same as that of the conventional art shown in FIG. 12, its explanation is omitted herein. Only a control arithmetic circuit of the invention is shown in FIG. 10.

FIG. 10 shows a control block diagram of the anti-theft unit 82, which is adapted to receive signals from the engine speed detector 85, ACC contact signals from the starter switch 10, and, via the antenna 6, the ID code of an ID tag 7.

A rotation determining unit 86 which serves as a determining means for ascertaining build-up of engine rotation is connected to the engine speed detector 85. The rotation determining unit 86 performs this function based on results of detection by the engine speed detector 85. To be more specific, the rotation determining unit 86 serves to read a signal from the engine speed detector 85 so as to output an OFF signal when the engine speed is lower than a given speed, and an ON signal at all other times.

An ID code determining unit 87 which serves as a collating means is connected to the antenna 6. An ID code storage unit 88 is connected to the ID code determining unit 87.

The ID code determining unit 87 is designed to read an ID code from an ID tag 7 via the antenna 6 when the output from the rotation determining unit 86 is on and collate the ID code that has been read with the ID code in the ID code storage unit 88. In cases where the ID code determining unit 87 does not recognize an ID code or ascertains that the two ID codes do not match, the ID code determining unit 87 outputs an ON signal. When a match is ascertained, the ID code determining unit 87 outputs an OFF signal.

A timer 89 is connected to the ID code determining unit 87. The timer 89 serves to output an ON signal for a given period of time upon receiving an ON signal from the ID code determining unit 87.

The ID code determining unit 87 is connected to the relay 33, which serves to activate the engine stop relay 36. The timer 89 is connected to the relay 34, which serves to activate the alarm unit 38.

Referring to FIG. 9, the relay 33, the engine stop relay 36, and the engine stop valve 37 together form a machine stopping means for forcing the machine to stop. The relay 34 and the alarm unit 38 together form an alarm output means for outputting an alarm.

Next, the function of the third embodiment is explained. As the circuit shown in FIG. 9 has the same function of starting up the engine as in the case of the conventional art described above, its explanation is omitted herein. Therefore, the function concerning the present invention will now be explained.

(1) When the Construction Machine is Operated with the Engine Being Started by an Unauthorized Means An explanation is given of a situation where the construction machine is improperly operated by connecting the plus line of the battery 9 directly to the starter motor 15 to start the engine 22.

Upon build-up of engine rotation, the rotation determining unit 86 outputs an ON signal to activate the ID code determining unit 87.

The ID code determining unit 87 is designed to output an ON signal or an OFF signal as a result of its function of reading an ID code and collating it with the ID code stored in the ID code storage unit 88; in cases where no ID code has been received or the two ID codes do not match, the ID code determining unit 87 outputs an ON signal. When a match is ascertained, the ID code determining unit 87 outputs an OFF signal.

In other words, should the engine 22 be started by an unauthorized means, the ID code determining unit 87 outputs an ON signal. This means that starting the engine 22 by the plus line of the battery 9 directly to the starter motor 15 causes the ID code determining unit 87 to outputs an ON signal.

As a result, the engine stop valve 37 is activated via the relay 33 and the engine stop relay 36 so that the engine stop valve 37 interrupts the fuel to the engine 22 so as to stop the engine 22. Meanwhile, the ON signal output from the ID code determining unit 87 also energizes the relay 34 via the timer 89, thereby activating alarm unit 38 to notify those who are in the vicinity of an attempt of theft.

(2) When an Engine Key that Does Not Permit Identification of an Individual is Used Should any engine key other than an engine key 8 that permits identification of an individual by means of an ID tag 7 is used, the ID code determining unit 87 outputs an ON signal to activate the engine stop valve 37 via the relay 33 and the engine stop relay 36, thereby preventing the engine 22 from starting up. Meanwhile, the ON signal output from the ID code determining unit 87 also causes the timer 89 to output an ON signal, i.e. an alarm signal, for a given period of time so that the alarm unit 38 is activated by the relay 34.

(3) When the Anti-Theft Unit is Removed

As shown in FIG. 9, the anti-theft system of the third embodiment has such a configuration that signals from the engine speed detector 85 are input into the anti-theft unit 81, from which signals are output to the engine controller 84. Therefore, should the anti-theft unit 81 be removed or the cable be cut, the start-up of the engine 22 would be disabled, making theft of the machine difficult.

Next, the effects of the third embodiment is described.

The features described above offer benefits as follows:

(1) Should the engine 22 be started by connecting the plus line of the battery 9 directly to the starter motor 15, the anti-theft system outputs a signal to stop the engine and sound an alarm. Thus, theft of the construction machine by use of an unauthorized means can be prevented.

(2) Should an engine key that does not permit identification of an individual be used, the anti-theft unit 81 functions to prevent the engine 22 from starting and output an alarm signal to the alarm unit 38. Thus, theft of a construction machine by use of an unauthorized engine key can reliably be prevented.

(3) Signals from the engine speed detector 85 are input into the engine controller 84 via the anti-theft unit 81. Therefore, should the anti-theft unit 81 be removed or the cable be cut, the start-up of the engine 22 would be disabled. The anti-theft system of the third embodiment is thus capable of preventing theft of the construction machine which could otherwise be effected by cutting a cable or removing the anti-theft unit 81.

POSSIBLE INDUSTRIAL APPLICATION

The present invention is applicable to not only hydraulic excavators but also other construction machines, such as loaders and bulldozers.

The invention claimed is:

1. A construction machine comprising:
    a machine body;
    an engine that serves as a power source for the machine body;
    a key-removal detecting device detecting removal of the engine key after the engine is stopped;
    a posture detecting device detecting a posture of the machine body; and
    an anti-theft unit outputting an alarm signal in cases where an upper structure machine body from which the engine key has been removed is not in a given, proper parking posture, said anti-theft unit comprising:
        a unit mounting portion in which the anti-theft unit is installed and which is provided at such a location that it is inside the bottom portion of the upper structure and faces the undercarriage when the machine body is in a given, proper parking posture, and
        a cover for closing off the unit mounting portion from underneath;
    wherein the anti-theft unit is designed to force the engine to stop and output an alarm signal when the construction machine from which the engine key has been removed is no longer in a given, proper parking posture as a result of unauthorized start-up of the engine.

2. A construction machine comprising:
    an undercarriage;
    an upper structure rotatably mounted on the undercarriage;
    an engine that serves as a power source for the undercarriage and the upper structure;
    a key-removal detecting device detecting removal of the engine key after the engine is stopped;
    a posture detecting device detecting a rotated posture of the upper structure; and
    an anti-theft unit outputting an alarm signal in cases where the upper structure from which the engine key has been removed is not in a given, proper parking posture.

3. A construction machine as claimed in claim 2, wherein:
    the anti-theft unit outputs an alarm signal in cases where the upper structure is not in a given, proper parking posture when the engine key is removed, said anti-theft unit comprising:
        a unit mounting portion in which the anti-theft unit is installed and which is provided at such a location that it is inside the bottom portion of the upper structure and faces the undercarriage when the machine body is in a given, proper parking posture, and
        a cover for closing off the unit mounting portion from underneath.

4. A construction machine comprising:

a machine body having an identification code;

an identification code input device inputting an identification code of an operator of the machine body;

a posture detecting device detecting a posture of the machine body;

a posture storage device storing the posture of the machine body at the time the machine is parked;

a determining device comparing output from the posture detecting device and output from the posture storage device determining whether the machine body has been actuated;

a collating device collating the identification code of the operator, which has been read according to a result of determination of actuation of the machine body by the determining device, with the identification code of the machine body;

a machine stopping device forcing the machine body to stop when the result of collation by the collating device has proven to not match; and an alarm output device outputting an alarm when the result of collation by the collating device has proven to not match, wherein the machine body includes a work arm which is adapted to be operated vertically and is provided with at least one hydraulic actuator for operating the work arm;

wherein said hydraulic actuator is provided with a pressure detector for detecting whether the distal end of the work arm is in contact with the ground;

wherein the posture detecting device is provided at such a location as to be able to detect the posture of the work arm; and wherein the alarm output device serves to output an alarm when the pressure detector detects that the distal end of the work arm is not in contact with the ground when the machine body is in the parked state.

5. A construction machine comprising:

a machine body having an identification code;

an identification code input device inputting an identification code of an operator of the machine body;

an engine which serves as a power source for the machine body;

an engine rotation detector for detecting rotation of the engine;

a determining device ascertaining build-up of engine rotation based on a result of detection by the engine rotation detector;

a collating device collating the identification code of an operator, which has been read according to a result of determination by the determining device of build-up of engine rotation, with the identification code of the machine body; and a machine stopping device and an alarm output device which are respectively adapted to force the machine body to stop and output an alarm when the result of collation by the collating device has proven to not match.

6. A construction machine as claimed in claim 2, wherein:

the anti-theft unit is designed to force the engine to stop and output an alarm signal when the construction machine from which the engine key has been removed is no longer in a given, proper parking posture as a result of unauthorized start-up of the engine.

* * * * *